(12) United States Patent
Lin

(10) Patent No.: US 11,096,265 B1
(45) Date of Patent: Aug. 17, 2021

(54) LAMP GROUP SWITCHING CONTROL DEVICE

(71) Applicant: Chicony Power Technology Co., Ltd., New Taipei (TW)

(72) Inventor: Chen-Chi Lin, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/013,870

(22) Filed: Sep. 8, 2020

(30) Foreign Application Priority Data

Jul. 15, 2020 (TW) ................................ 109123891

(51) Int. Cl.
*H05B 47/20* (2020.01)
*B60Q 1/076* (2006.01)
*B60Q 1/00* (2006.01)

(52) U.S. Cl.
CPC ........... *H05B 47/20* (2020.01); *B60Q 1/0076* (2013.01); *B60Q 1/0094* (2013.01); *B60Q 1/076* (2013.01)

(58) Field of Classification Search
CPC .... H05B 47/20; B60Q 1/0076; B60Q 1/0094; B60Q 1/076; B60Q 1/1446; B60Q 1/343; B60Q 1/40
See application file for complete search history.

(56) References Cited

U.S. PATENT DOCUMENTS

| 5,646,485 | A | 7/1997 | Simon et al. | |
|---|---|---|---|---|
| 7,276,857 | B2 | 10/2007 | Logsdon et al. | |
| 8,659,237 | B2 * | 2/2014 | Archenhold | H05B 45/385 315/297 |
| 8,901,847 | B2 * | 12/2014 | Suzuki | H05B 47/16 315/291 |
| 9,462,647 | B2 * | 10/2016 | Fukui | H05B 45/3725 |
| 9,623,791 | B2 * | 4/2017 | Fukui | B60Q 1/0094 |
| 9,763,289 | B2 * | 9/2017 | Herfurth | H05B 47/24 |
| 9,764,682 | B2 * | 9/2017 | Jwania | H05B 45/3725 |
| 10,166,912 | B2 * | 1/2019 | Wonhong | B60Q 1/1415 |
| 10,237,934 | B1 * | 3/2019 | Lin | H05B 45/382 |
| 10,426,012 | B2 * | 9/2019 | Yanagizu | B60Q 1/04 |
| 10,568,168 | B1 * | 2/2020 | Lin | H05B 45/37 |
| 10,728,993 | B2 * | 7/2020 | Chen | H05B 45/3725 |
| 10,752,164 | B2 * | 8/2020 | Ichikawa | H05B 45/50 |
| 10,849,202 | B1 * | 11/2020 | Lin | H05B 45/3725 |
| 2004/0004451 | A1 * | 1/2004 | Ito | H05B 41/38 315/294 |

(Continued)

FOREIGN PATENT DOCUMENTS

| CN | 1805646 | 7/2006 |
|---|---|---|
| CN | 201243397 | 5/2009 |

(Continued)

*Primary Examiner* — Borna Alaeddini
(74) *Attorney, Agent, or Firm* — JCIPRNET (57) ABSTRACT

A lamp group switching control device for switching and controlling a first lamp group and a second lamp group is provided. When receiving a first power source for driving the first lamp group, the lamp group switching control device controls that only the first lamp group provides a first light signal regardless of whether a second power source for driving the second lamp group is received. When the first power source is not received and the second power source is received, the lamp group switching control device controls that only the second lamp group provides the second light signal.

12 Claims, 5 Drawing Sheets

(56) References Cited

U.S. PATENT DOCUMENTS

| | | | |
|---|---|---|---|
| 2005/0218838 A1* | 10/2005 | Lys | H05B 45/355 315/291 |
| 2006/0214603 A1* | 9/2006 | Oh | H05B 45/3725 315/246 |
| 2007/0029938 A1* | 2/2007 | Lin | B60Q 1/1407 315/82 |
| 2007/0273306 A1* | 11/2007 | Fujino | H05B 45/38 315/312 |
| 2010/0013395 A1* | 1/2010 | Archibald | H05B 45/46 315/185 R |
| 2014/0049160 A1* | 2/2014 | Baier | B60Q 1/38 315/77 |
| 2015/0069908 A1* | 3/2015 | Fukui | H05B 45/385 315/82 |
| 2016/0227616 A1* | 8/2016 | Lee | H05B 45/37 |
| 2018/0063909 A1* | 3/2018 | Kishimoto | B60Q 1/1423 |
| 2018/0339641 A1* | 11/2018 | Matsui | H05B 45/14 |
| 2018/0361911 A1* | 12/2018 | Santaella | B60Q 1/0076 |
| 2019/0077301 A1* | 3/2019 | Kosugi | H05B 45/395 |
| 2019/0098710 A1* | 3/2019 | Murakami | H05B 45/3725 |
| 2020/0178367 A1* | 6/2020 | Hara | H05B 45/54 |
| 2020/0238890 A1* | 7/2020 | Ichikawa | H05B 45/48 |
| 2020/0238893 A1* | 7/2020 | Santaella | B60Q 1/08 |
| 2021/0101520 A1* | 4/2021 | Schellinger | B60Q 1/0094 |

FOREIGN PATENT DOCUMENTS

| | | |
|---|---|---|
| CN | 110300477 | 10/2019 |
| TW | M267107 | 6/2005 |
| TW | I294372 | 3/2008 |
| TW | M341995 | 10/2008 |

\* cited by examiner

LAMP GROUP SWITCHING CONTROL DEVICE

CROSS-REFERENCE TO RELATED APPLICATION

This application claims the priority benefit of Taiwan application serial no. 109123891, filed on Jul. 15, 2020. The entirety of the above-mentioned patent application is hereby incorporated by reference herein and made a part of this specification.

BACKGROUND

Technical Field

The disclosure relates to a switching control device, and more particularly to a lamp group switching control device capable of providing protective measures when multiple lamp groups are simultaneously powered.

Description of Related Art

Circuit designs to power different lamp groups (such as low beam lamps, high beam lamps, turn signals, and daytime running lamps) simultaneously are adopted in vehicle illumination in some regions (e.g., China or Europe). Due to insufficient illumination, some car owners may power different lamp groups (e.g., low beam lamps and high beam lamps) via improper modifications. However, this results in simultaneous illumination of different lamp groups.

Powering different lamp groups simultaneously, improper modifications, or abnormalities may result in the simultaneous illumination of different lamp groups. The thermal stress caused by different lamp groups being illuminated at the same time will greatly shorten the life of related vehicle lighting components and do harm to other passers-by. Therefore, how to prevent different lamp groups from being illuminated at the same time when the different lamp groups are simultaneously powered is one of the development focuses in the art and the technical personnel.

SUMMARY

The disclosure provides a lamp group switching control device capable of providing protective measures when multiple lamp groups are simultaneously powered.

The lamp group switching control device of the disclosure is configured to control a first lamp group and a second lamp group. The lamp group switching control device includes a first power terminal, a second power terminal, a third power terminal, an input detection circuit, a first switch, a switch driving circuit, a shut-off circuit, and a state retaining circuit. The first power terminal is coupled to a first terminal of the first lamp group. The second power terminal is coupled to a first terminal of the second lamp group. The third power terminal is coupled to a second terminal of the first lamp group. The input detection circuit is coupled to the first power terminal. The input detection circuit is configured to provide a first control signal in response to a high voltage level in the first power terminal and a second control signal in response to a low voltage level in the first power terminal. The first switch is coupled between a second terminal of the second lamp group and the third power terminal. The switch driving circuit is coupled to the first switch and the second power terminal. The switch driving circuit is configured to provide a driving voltage to turn on the first switch in response to a voltage level in the second power terminal. The shut-off circuit is coupled to the input detection circuit and the switch driving circuit. The state retaining circuit is coupled to the input detection circuit. The state retaining circuit is configured to maintain the first control signal. When the first power terminal receives a first power source and the third power terminal receives a reference low power source, the shut-off circuit pulls down the driving voltage to turn off the first switch according to the first control signal so that only the first lamp group provides a first light signal. When the first power terminal does not receive the first power source, the second power terminal receives the second power source, and the third power terminal receives the reference low power source, the shut-off circuit is disabled according to the second control signal, and the first switch is turned on according to the driving voltage so that only the second lamp group provides a second light signal.

Based on the above, when the first power source for driving the first lamp group is received, regardless of whether the second power source for driving the second lamp group is received, the lamp group switching control device controls that only the first lamp group provides the first light signal. When the first power source is not received and the second power source is received, the lamp group switching control device controls that only the second lamp group provides the second light signal. In this way, the lamp group switching control device of the disclosure is capable of providing protective measures when multiple lamp groups are simultaneously powered.

In order to make the aforementioned features and advantages of the disclosure comprehensible, embodiments accompanied with drawings are described in detail below.

DESCRIPTION IN THE EMBODIMENTS

Some embodiments of the disclosure will be described in detail with reference to the accompanying drawings. For reference numerals cited in the following descriptions, the same reference numerals appearing in different drawings are regarded as the same or similar elements. The embodiments are only a part of the disclosure and do not disclose all possible implementations of the disclosure. More precisely, the embodiments are merely examples of the device and the method in the scope of the present application.

Figure 1:
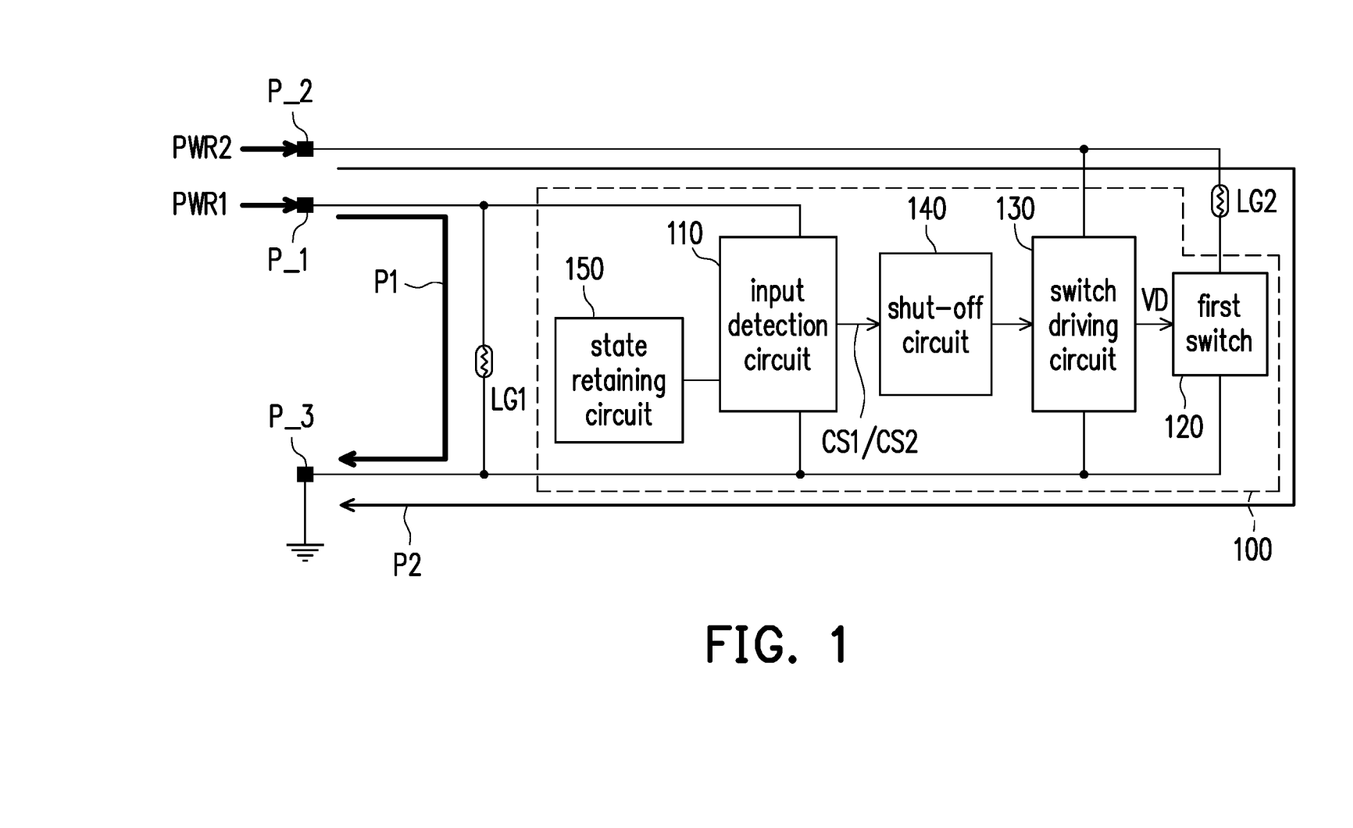
FIG. 1 is a schematic device view of a lamp group switching control device according to a first embodiment of the disclosure.

Referring to FIG. 1, FIG. 1 is a schematic device view of a lamp group switching control device according to a first embodiment of the disclosure. A lamp group switching control device 100 of the present embodiment is adapted to control a first lamp group LG1 and a second lamp group LG2. In the present embodiment, the lamp group switching control device 100 includes a first power terminal P_1, a second power terminal P_2, and a third power terminal P_3. The first power terminal P_1 is coupled to a first terminal of the first lamp group LG1. The second power terminal P_2 is coupled to a first terminal of the second lamp group LG2. The third power terminal P_3 is coupled to a second terminal of the first lamp group LG1.

In the present embodiment, the lamp group switching control device 100 further includes an input detection circuit 110, a first switch 120, a switch driving circuit 130, and a shut-off circuit 140. The input detection circuit 110 is coupled to the first power terminal P_1. The input detection circuit 110 provides either a first control signal CS1 or a second control signal CS2 according to a voltage level received by the first power terminal P_1. For example, the input detection circuit 110 provides the first control signal CS1 in response to a high voltage level in the first power terminal P_1 and the second control signal CS2 in response to a low voltage level in the first power terminal P_1. In the present embodiment, the first switch 120 is coupled between a second terminal of the second lamp group LG2 and the third power terminal P_3. The switch driving circuit 130 is coupled to the first switch 120 and the second power terminal P_2. The switch driving circuit 130 provides a driving voltage VD for turning on the first switch 120 in response to a voltage level in the second power terminal P_2.

In the present embodiment, when the first power terminal P_1 receives a first power source PWR1, and the third power terminal P_3 receives a reference low power source (e.g., ground power), the input detection circuit 110 provides the first control signal CS1. The shut-off circuit 140 is coupled to the input detection circuit 110 and the switch driving circuit 130. The shut-off circuit 140 pulls down the voltage level of the driving voltage VD to a low voltage level according to the first control signal CS1, thereby turning off the first switch 120. Therefore, only the first lamp group LG1 provides a first light signal. That is, when the first power terminal P_1 receives the first power source PWR1, and the third power terminal P_3 receives the reference low power source, regardless of whether a second power source PWR2 is received by the second power terminal P_2, the lamp group switching control device 100 controls that the first lamp group LG1 provides the first light signal and the second lamp group LG2 does not provide a second light signal. It can be seen that the lamp group switching control device 100 gives priority to the operation of the first lamp group LG1.

In addition, when the first power terminal P_1 does not receive the first power source PWR1, the second power terminal P_2 receives the second power source PWR2, and the third power terminal P_3 receives the reference low power source, the shut-off circuit 140 is disabled according to the second control signal CS2, and the first switch 120 is turned on according to the driving voltage VD, so that only the second lamp group LG2 provides the second light signal. That is, when the first power terminal P_1 does not receive the first power source PWR1, the second power terminal P_2 receives the second power source PWR2, and the third power terminal P_3 receives the reference low power source, the lamp group switching control device 100 controls that the second lamp group LG2 provides the second light signal and the first lamp group LG1 does not provide the first light signal.

For example, a first operation scenario refers to when the first power terminal P_1 receives the first power source PWR1, the second power terminal P_2 receives the second power source PWR2, and the third power terminal P_3 receives the reference low power source. Specifically, in the first operation scenario of the present embodiment, in an interval when the first power terminal P_1 receives the first power source PWR1, the second power terminal P_2 receives the second power source PWR2, and the third power terminal P_3 receives the reference low power source. In the present embodiment, the first operation scenario may also refer to while the first power terminal P_1 is receiving the first power source PWR1, the second power terminal P_2 is receiving the second power source PWR2, and the third power terminal P_3 is receiving the reference low power source. In the aforementioned first operation scenario, a first power path P1 of the first power source PWR1 is connected. The first lamp group LG1 provides the first light signal through the first power source PWR1, and the input detection circuit 110 provides the first control signal CS1 according to the first power source PWR1. The switch driving circuit 130 provides the driving voltage VD according to the second power source PWR2. However, the shut-off circuit 140 pulls down the voltage level of the driving voltage VD according to the first control signal CS1. Therefore, the first switch 120 is turned off, and a second power path P2 of the second power source PWR2 is disconnected. In other words, the lamp group switching control device 100 disconnects the second power path P2 in response to the first power source PWR1 received by the first power terminal P_1. Therefore, the second lamp group LG2 stops providing the second light signal due to the disconnected second power path P2.

Furthermore, a second operation scenario refers to when the first power terminal P_1 receives the first power source PWR1, the third power terminal P_3 receives the reference low power source, and the second power terminal P_2 does not receive the second power source PWR2. In the second operation scenario, the first power path P1 of the first power source PWR1 is connected. The first lamp group LG1 provides the first light signal through the first power source PWR1. Since the second power terminal P_2 does not receive the second power source PWR2, the switch driving circuit 130 does not provide the driving voltage VD. Therefore, the first switch 120 is turned off, and the second power path P2 of the second power source PWR2 is disconnected. In this way, the second lamp group LG2 stops providing the second light signal due to the disconnected second power path P2.

Moreover, a third operation scenario refers to when the second power terminal P_2 receives the second power source PWR2, the third power terminal P_3 receives the reference low power source, and the first power terminal P_1 does not receive the first power source PWR1. In the third operation scenario, the first lamp group LG1 does not provide the first light signal because the first power source PWR1 is not received, and the input detection circuit 110 provides the second control signal CS2 because the first power source PWR1 is not received. The switch driving circuit 130 provides the driving voltage VD according to the second power source PWR2. The shut-off circuit 140 does not pull down the voltage level of the driving voltage VD according to the second control signal CS2. The voltage level of the driving voltage VD is maintained. Therefore, the first switch 120 is turned on, and the second power path P2 of the second power source PWR2 is connected. In this way, the second lamp group LG2 provides the second light signal through the second power source PWR2.

Note that when the first power source PWR1 for driving the first lamp group LG1 is received, regardless of whether the second power source PWR2 for driving the second lamp group LG2 is received, the lamp group switching control device 100 controls that only the first lamp group LG1 provides the first light signal. When the first power source PWR1 is not received and the second power source PWR2 is received, the lamp group switching control device 100 controls that only the second lamp group LG2 provides the second light signal. In this way, the lamp group switching control device 100 is capable of providing protective measures when the first lamp group LG1 and the second lamp group LG2 are simultaneously powered. The lamp group switching control device 100 gives priority to the operation of the first lamp group LG1.

In the present embodiment, the first lamp group LG1 and the second lamp group LG2 may be designed for different applications. For example, the first lamp group LG1 is a high beam lamp, and the second lamp group LG2 is a low beam lamp. In the embodiment, when the first power source PWR1 is received regardless of whether the second power source PWR2 is received, the lamp group switching control device 100 controls that only the high beam lamp emits light. When the first power source PWR1 is not received and the second power source PWR2 is received, the lamp group switching control device 100 controls that only the low beam lamp emits light.

For example, the first lamp group LG1 is a turn signal (i.e., a direction indicator), and the second lamp group LG2 is a daytime running lamp. In the embodiment, when the first power source PWR1 is received regardless of whether the second power source PWR2 is received, the lamp group switching control device 100 controls that only the turn signal emits light. When the first power source PWR1 is not received and the second power source PWR2 is received, the lamp group switching control device 100 controls that only the daytime running lamp emits light. Therefore, the lamp group switching control device 100 complies with Regulation No. 48 of the Economic Commission for Europe of the United Nations.

Generally, when the first lamp group LG1 is the turn signal and the second lamp group LG2 is the daytime running lamp, the first power source PWR1 has a duty cycle so that the input detection circuit 110 alternately provides the first control signal CS1 and the second control signal CS2 according to the duty cycle. Therefore, both the turn signal and the daytime running lamp flash. In the present embodiment, the lamp group switching control device 100 further includes a state retaining circuit 150. The state retaining circuit 150 is coupled to the input detection circuit 110. Once the input detection circuit 110 provides the first control signal CS1, the state retaining circuit 150 maintains the voltage level of the first control signal CS1 for a fixed time so that the second power path P2 is still disconnected. Therefore, when the turn signal flashes, the daytime running lamp stops emitting light.

Figure 2:
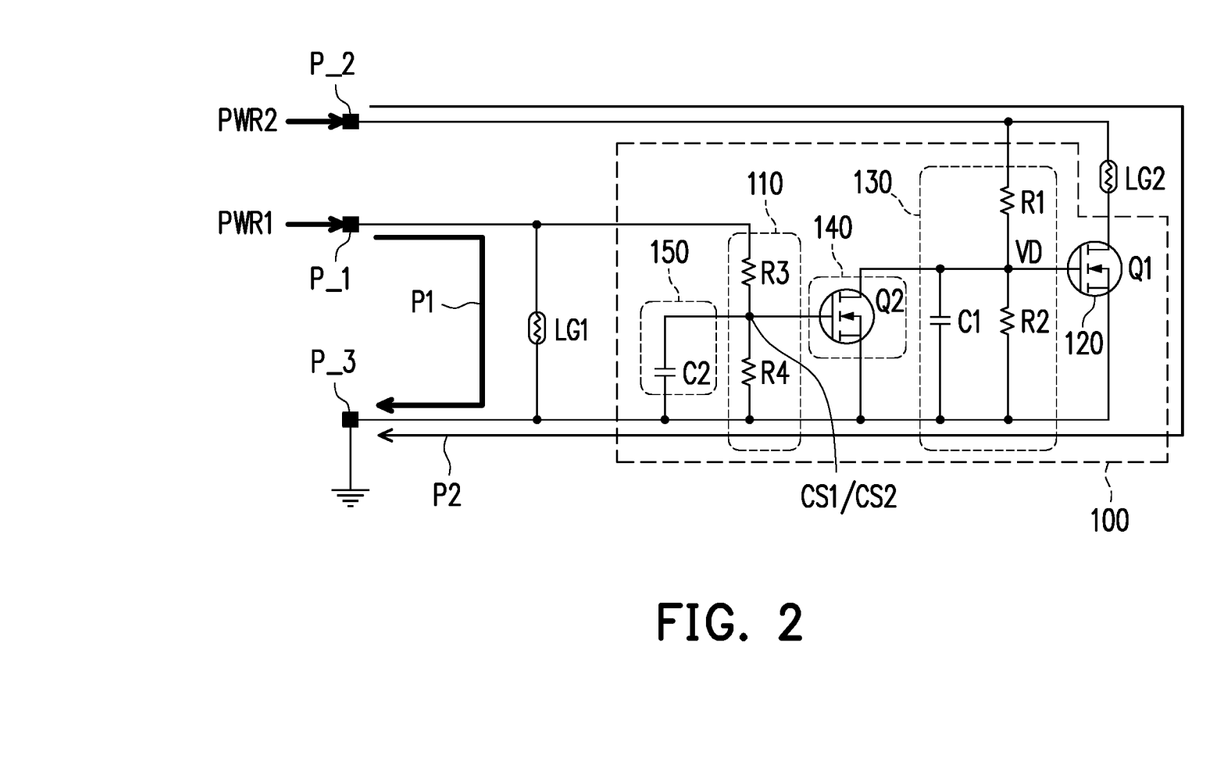
FIG. 2 is a circuit diagram of the lamp group switching control device according to the first embodiment.

The circuit configuration of the lamp group switching control device is further illustrated below. Referring to FIG. 2, FIG. 2 is a circuit diagram of the lamp group switching control device according to the first embodiment. In the present embodiment, the switch driving circuit 130 includes a resistor R1, a resistor R2, and a capacitor C1. A first terminal of the resistor R1 is coupled to the second power terminal P_2. A second terminal of the resistor R1 is coupled to a control terminal of the first switch 120. A first terminal of the resistor R2 is coupled to the second terminal of the resistor R1. A second terminal of the resistor R2 is coupled to the second terminal of the first switch 120. The capacitor C1 and the resistor R2 are coupled in parallel. In the present embodiment, the second terminal of the resistor R1 serves as an output terminal of the switch driving circuit 130. The switch driving circuit 130 is also capable of filtering noise accompanying the second power source PWR2 through the capacitor C1.

In the present embodiment, the input detection circuit 110 includes a resistor R3 and a resistor R4. A first terminal of the resistor R3 is coupled to the first power terminal P_1. A second terminal of the resistor R3 is coupled to a control terminal of a second switch Q2. A first terminal of the resistor R4 is coupled to the second terminal of the resistor R3. A second terminal of the resistor R4 is coupled to a second terminal of the second switch Q2. The second terminal of the resistor R3 serves as an output terminal of the input detection circuit 110. The state retaining circuit 150 includes a capacitor C2. A first terminal of the capacitor C2 is coupled to the second terminal of the resistor R3. A second terminal of the capacitor C2 is coupled to the second terminal of the second switch Q2. The shut-off circuit 140 includes the second switch Q2. A first terminal of the second switch Q2 is coupled to the first terminal of the resistor R2. The second terminal of the second switch Q2 is coupled to the second terminal of the resistor R2. The control terminal of the second switch Q2 is coupled to the input detection circuit 110 to receive either the first control signal CS1 or the second control signal CS2. In the present embodiment, the first switch 120 may be, for example, an N-type metal-oxide-semiconductor (MOS) field effect transistor. The second switch Q2 may be, for example, an NMOS field effect transistor.

In the first operation scenario when the first power terminal P_1 receives the first power source PWR1, the second power terminal P_2 receives the second power source PWR2, and the third power terminal P_3 receives the reference low power source, the first power path P1 of the first power source PWR1 is connected. Therefore, the first lamp group LG1 provides the first light signal through the first power source PWR1. The input detection circuit 110 divides the received voltage level of the first power source PWR1 by the resistor R3 and the resistor R4 to generate the first control signal CS1, and provides the first control signal CS1 through the second terminal of the resistor R3. The switch driving circuit 130 divides a voltage of the second power source PWR2 by the resistor R1 and the resistor R2 to generate the driving voltage VD, and provides the driving voltage VD through the second terminal of the resistor R1. However, the second switch Q2 of the shut-off circuit 140 is turned on to pull down the voltage level of the driving voltage VD according to the first control signal CS1. The first switch 120 is turned off. Therefore, the second power path P2 formed by the second power terminal P_2, the second lamp group LG2, the first switch 120, and the third power terminal P_3 is disconnected. The second lamp group LG2 stops providing the second light signal due to the disconnected second power path P2.

In the second operation scenario, the first power terminal P_1 receives the first power source PWR1, the third power terminal P_3 receives the reference low power source, and the second power terminal P_2 does not receive the second power source PWR2. Therefore, only the first power path P1 of the first power source PWR1 is connected. The first lamp group LG1 provides the first light signal through the first power source PWR1. Since the second power terminal P_2 does not receive the second power source PWR2, the switch driving circuit 130 is unable to divide the voltage of the second power source PWR2 to generate the driving voltage VD. Therefore, the first switch 120 is turned off, and the second power path P2 of the second power source PWR2 is disconnected. The second lamp group LG2 stops providing the second light signal due to the disconnected second power path P2.

In the third operation scenario, the second power terminal P_2 receives the second power source PWR2, the third power terminal P_3 receives the reference low power source, and the first power terminal P_1 does not receive the first power source PWR1. Therefore, the first lamp group LG1 does not provide the first light signal. Since the first power terminal P_1 does not receive the first power source PWR1, the input detection circuit 110 provides the second control signal CS2. The second switch Q2 of the shut-off circuit 140 is turned off according to the second control signal CS2. Therefore, the voltage level of the driving voltage VD is not pulled down by the second switch Q2. The first switch 120 is turned on according to the driving voltage VD. In this way, the second power path P2 is formed by the second power terminal P_2, the second lamp group LG2, and the turned-on first switch 120. The second lamp group LG2 provides the second light signal according to the second power path P2.

Figure 3:
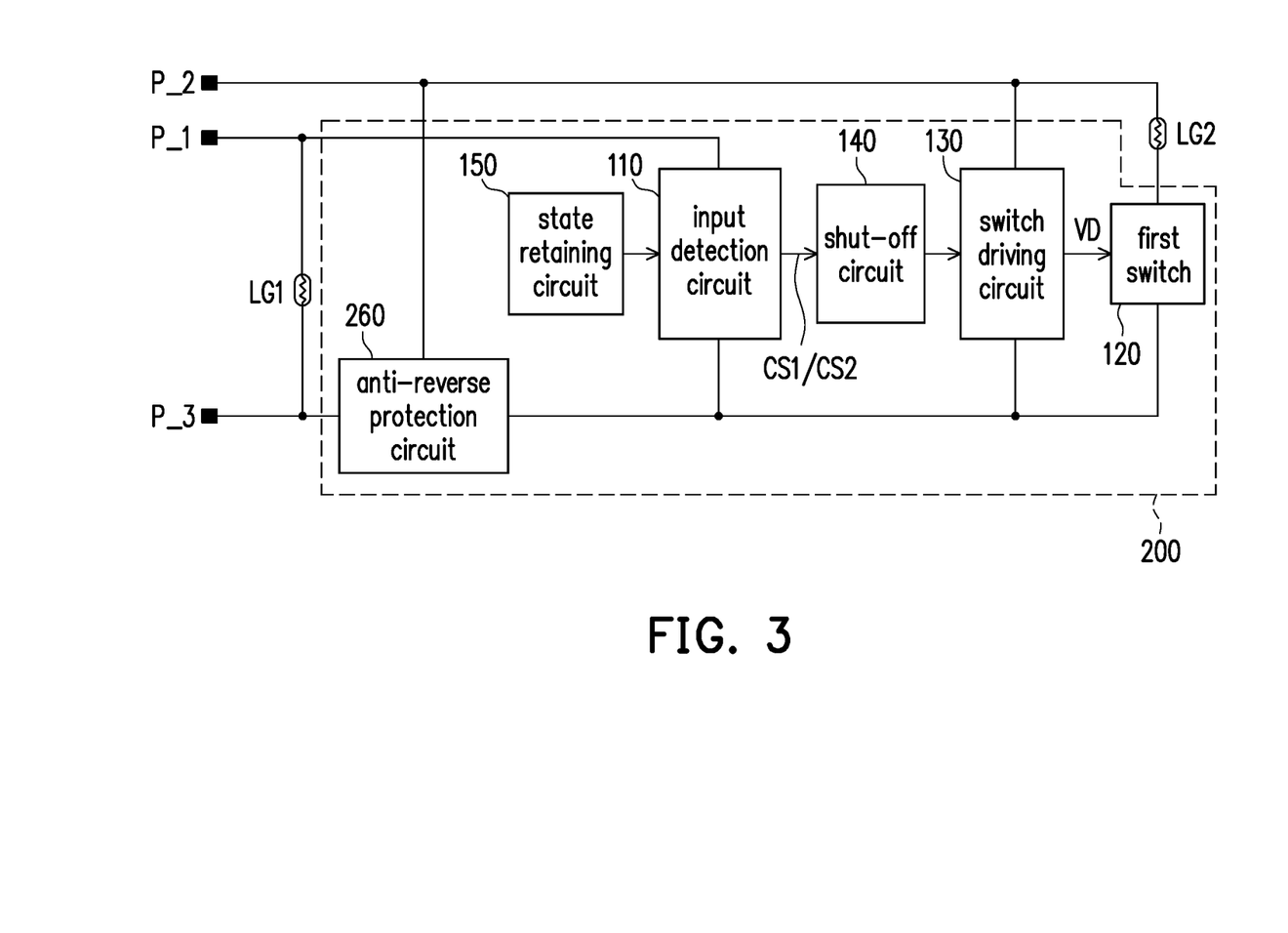
FIG. 3 is a schematic device view of a lamp group switching control device according to a second embodiment of the disclosure.

Referring to FIG. 3, FIG. 3 is a schematic device view of a lamp group switching control device according to a second embodiment of the disclosure. Different from the first embodiment, a lamp group switching control device 200 in the present embodiment further includes an anti-reverse protection circuit 260. The anti-reverse protection circuit 260 is coupled between the second terminal of the first switch 120 and the third power terminal P_3. In the present embodiment, when the second power terminal P_2 receives the reference low power source and the third power terminal P_3 receives the second power source PWR2, the anti-reverse protection circuit 260 is turned off to transmit the second power path P2 of the second power source PWR2. In this way, the anti-reverse protection circuit 260 is capable of protecting the lamp group switching control device 200 when the second power terminal P_2 receives the reference low power source and the third power terminal P_3 receives the second power source PWR2.

Figure 4:
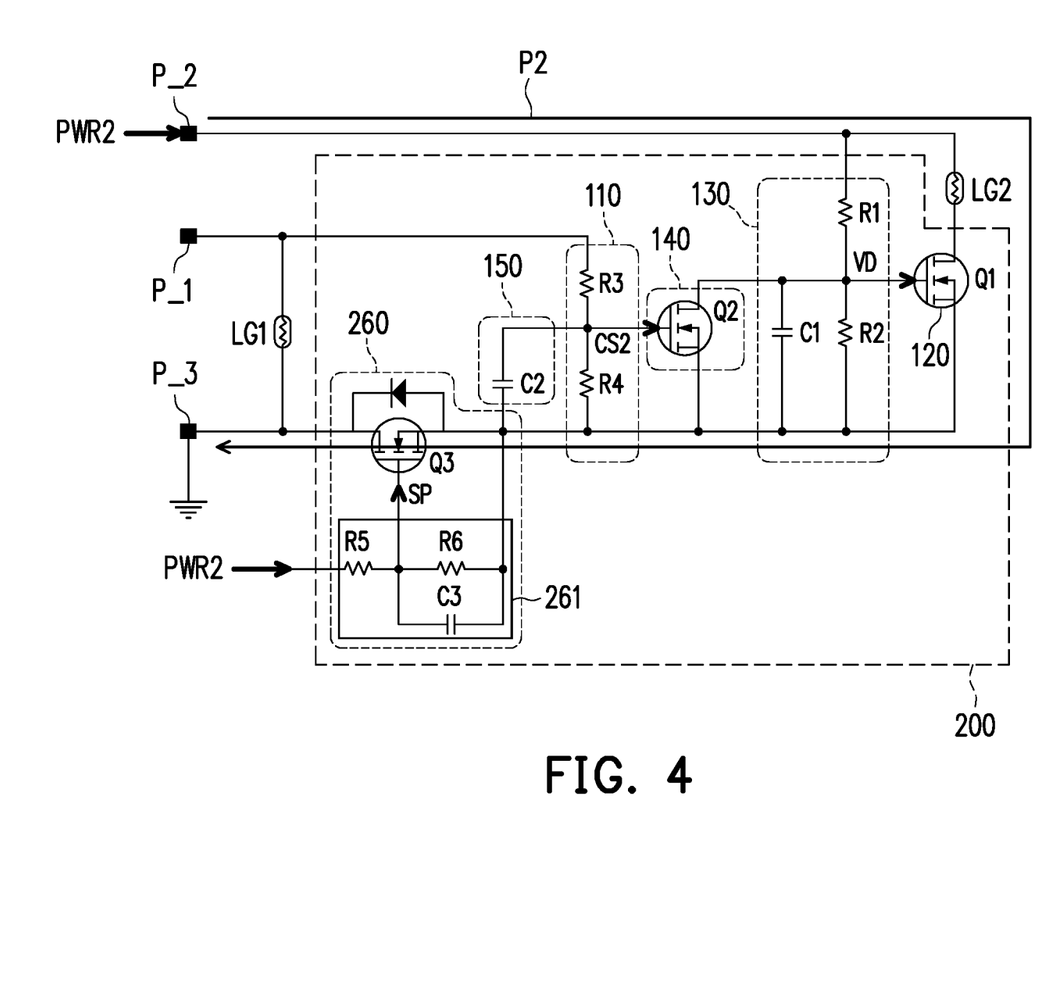
FIG. 4 is a schematic view of a correct connection of the lamp group switching control device according to the second embodiment.

Details of the implementation of the anti-reverse protection circuit are illustrated. First, referring to FIG. 4, FIG. 4 is a schematic view of a correct connection of the lamp group switching control device according to the second embodiment. In the present embodiment, the anti-reverse protection circuit 260 includes a voltage divider 261 and a third switch Q3. The voltage divider 261 is coupled to the second power terminal P_2. The voltage divider 261 divides the voltage in the second power terminal P_2 to generate a bypass signal SP. A control terminal of the third switch Q3 is coupled to the voltage divider 261 to receive the bypass signal SP. The third switch Q3 may be, for example, an NMOS field effect transistor.

In the present embodiment, in the third operation scenario, the first power terminal P_1 does not receive the first power source PWR1. The second power terminal P_2 receives the second power source PWR2. In addition, the third power terminal P_3 receives the reference low power source. The input detection circuit 110 provides the second control signal CS2. Therefore, the first switch 120 is turned on according to the driving voltage VD. The voltage divider 261 provides a bypass signal SP with a high voltage level according to the second power source PWR2. The third switch Q3 is turned on in response to the bypass signal SP with the high voltage level. Therefore, the second power path P2 formed by the second power terminal P_2, the second lamp group LG2, the first switch 120, the third switch Q3, and the third power terminal P_3 is connected.

In the present embodiment, the voltage divider 261 includes a resistor R5 and a resistor R6. A first terminal of the resistor R5 is coupled to the second power terminal P_2. A second terminal of the resistor R5 is coupled to the control terminal of the third switch Q3. A first terminal of the resistor R6 is coupled to the second terminal of the resistor R5. A second terminal of the resistor R6 is coupled to the second terminal of the first switch 120. A first terminal of the third switch Q3 is coupled to the second terminal of the first switch 120. A second terminal of the third switch Q3 is coupled to the third power terminal P_3. The voltage divider 261 also includes a capacitor C3. The capacitor C3 and the resistor R6 are coupled in parallel. The voltage divider 261 is capable of filtering the noise accompanying the second power source PWR2 by the capacitor C3. In some embodiments, the resistor R6 and the capacitor C3 may be coupled in parallel between the control terminal of the third switch Q3 and a ground potential.

Figure 5:
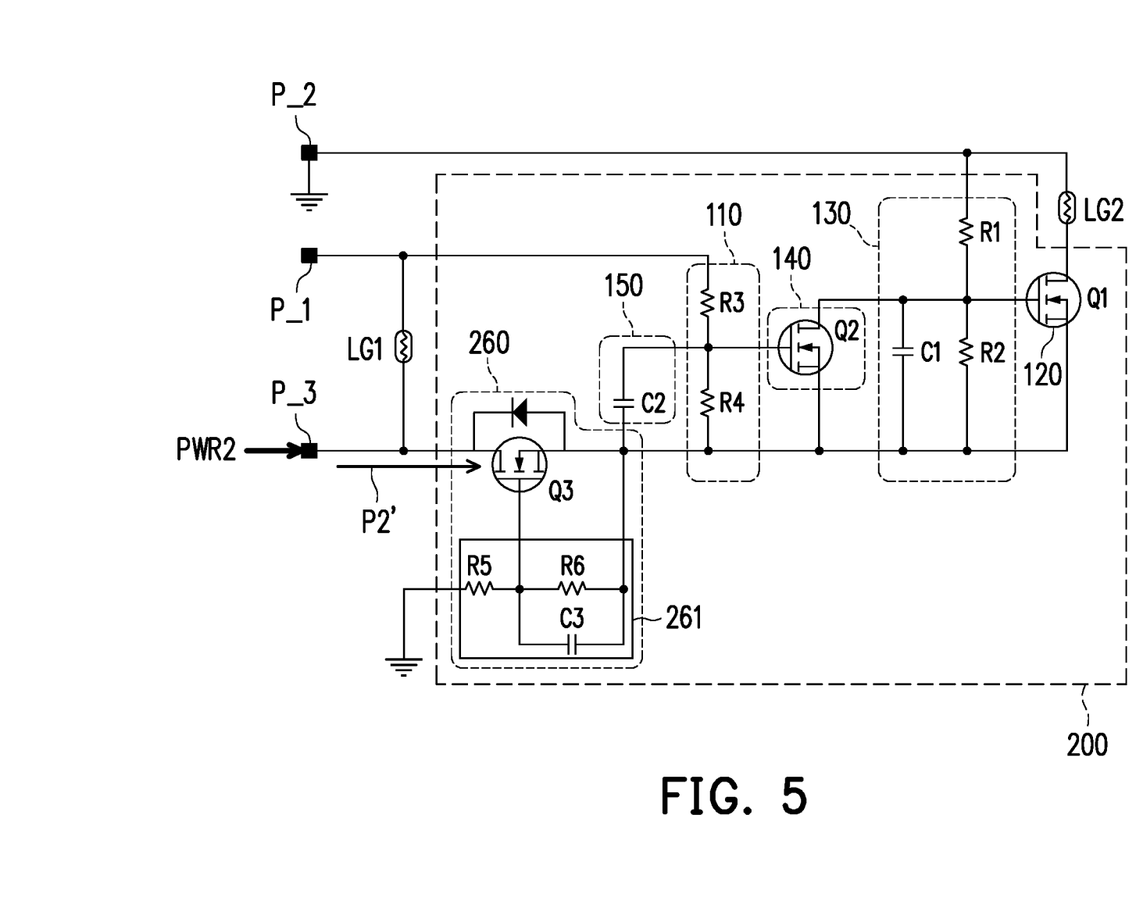
FIG. 5 is a schematic view of an incorrect connection of the lamp group switching control device according to the second embodiment.

Other details of the implementation of the anti-reverse protection circuit are illustrated. Referring to FIG. 5, FIG. 5 is a schematic view of an incorrect connection of the lamp group switching control device according to the second embodiment. In the present embodiment, the second power terminal P_2 receives the reference low power source, and the third power terminal P_3 receives the second power source PWR2. The aforementioned operation is a wrong connection. The first switch 120 is turned off. The voltage divider 261 does not provide the bypass signal SP with the high voltage level. Therefore, the third switch Q3 is turned off. In other words, once the second power terminal P_2 does not receive the second power source PWR2, the third switch Q3 is turned off. In addition, a parasitic diode located between the first terminal and the second terminal of the third switch Q3 also exhibits a reverse bias operation state. Therefore, the lamp group switching control device 200 does not generate the second power path P2 formed by the second power terminal P_2, the second lamp group LG2, the first switch 120, the third switch Q3, and the third power terminal P_3. The lamp group switching control device 200 only provides a power path P2' between the third power terminal P_3 and the anti-reverse protection circuit 260.

Based on the above, the lamp group switching control device of the disclosure controls that only the first lamp group provides the first light signal when the first power source for driving the first lamp group is received, regardless of whether the second power source for driving the second lamp group is received. In this way, the lamp group switching control device of the disclosure is capable of providing protective measures when multiple lamp groups are simultaneously powered. In addition, the anti-reverse protection circuit of the lamp group switching control device is capable of protecting the lamp group switching control device when the second power terminal does not receive the second power source.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A lamp group switching control device, configured to control a first lamp group and a second lamp group, wherein the lamp group switching control device comprises:
   a first power terminal coupled to a first terminal of the first lamp group;
   a second power terminal coupled to a first terminal of the second lamp group;
   a third power terminal coupled to a second terminal of the first lamp group;
   an input detection circuit coupled to the first power terminal, wherein the input detection circuit is configured to provide a first control signal in response to a high voltage level in the first power terminal and a second control signal in response to a low voltage level in the first power terminal;
   a first switch coupled between a second terminal of the second lamp group and the third power terminal;
   a switch driving circuit coupled to the first switch and the second power terminal, wherein the switch driving circuit is configured to provide a driving voltage to turn on the first switch in response to a voltage level in the second power terminal;
   a shut-off circuit coupled to the input detection circuit and the switch driving circuit; and
   a state retaining circuit coupled to the input detection circuit and configured to maintain the first control signal,
   wherein when the first power terminal receives a first power source and the third power terminal receives a reference low power source, the shut-off circuit pulls down the driving voltage to turn off the first switch according to the first control signal so that only the first lamp group provides a first light signal, and
   wherein when the first power terminal does not receive the first power source, the second power terminal receives the second power source, and the third power terminal receives the reference low power source, the shut-off circuit is disabled according to the second control signal, and the first switch is turned on according to the driving voltage so that only the second lamp group provides a second light signal.

2. The lamp group switching control device according to claim 1, wherein
   in an interval when the first power terminal receives the first power source, the second power terminal receives the second power source, and the third power terminal receives the reference low power source, the first lamp group provides the first light signal according to the first power source,
   the input detection circuit provides the first control signal,
   the switch driving circuit provides the driving voltage according to the second power source, and
   the shut-off circuit pulls down the driving voltage to turn off the first switch according to the first control signal so that the second lamp group stops providing the second light signal.

3. The lamp group switching control device according to claim 1, wherein the first lamp group is a high beam lamp, and the second lamp group is a low beam lamp.

4. The lamp group switching control device according to claim 1, wherein the first lamp group is a turn signal, and the second lamp group is a daytime running lamp.

5. The lamp group switching control device according to claim 1, wherein
   a first terminal of the first switch is coupled to the second terminal of the second lamp group, and the switch driving circuit comprises:
   a first resistor, wherein a first terminal of the first resistor is coupled to the second power terminal, and a second terminal of the first resistor is coupled to a control terminal of the first switch;
   a second resistor, wherein a first terminal of the second resistor is coupled to the second terminal of the first resistor, and a second terminal of the second resistor is coupled to a second terminal of the first switch; and
   a first capacitor, wherein the first capacitor and the second resistor are coupled in parallel, and the switch driving circuit provides the driving voltage through the second terminal of the first resistor.

6. The lamp group switching control device according to claim 5, wherein the shut-off circuit comprises:
   a second switch, wherein a first terminal of the second switch is coupled to the first terminal of the second resistor, a second terminal of the second switch is coupled to the second terminal of the second resistor, and a control terminal of the second switch is coupled to the input detection circuit to receive either the first control signal or the second control signal.

7. The lamp group switching control device according to claim 6, wherein the input detection circuit comprises:
   a third resistor, wherein a first terminal of the third resistor is coupled to the first power terminal, and a second terminal of the third resistor is coupled to the control terminal of the second switch; and
   a fourth resistor, wherein a first terminal of the fourth resistor is coupled to the second terminal of the third resistor, and a second terminal of the fourth resistor is coupled to the second terminal of the second switch.

8. The lamp group switching control device according to claim 7, wherein the state retaining circuit comprises:
   a second capacitor, wherein a first terminal of the second capacitor is coupled to the second terminal of the third resistor, and a second terminal of the second capacitor is coupled to the second terminal of the second switch.

9. The lamp group switching control device according to claim 5, further comprising:
   an anti-reverse protection circuit coupled between the second terminal of the first switch and the third power terminal, wherein the anti-reverse protection circuit is configured to disconnect a transmission path of the second power source when the second power terminal receives the reference low power source, and the third power terminal receives the second power source.

10. The lamp group switching control device according to claim 9, wherein the anti-reverse protection circuit comprises:
    a voltage divider coupled to the second power terminal and configured to divide a voltage in the second power terminal to generate a bypass signal; and
    a third switch, wherein a first terminal of the third switch is coupled to the second terminal of the first switch, a second terminal of the third switch is coupled to the third power terminal, and a control terminal of the third switch is coupled to the voltage divider to receive the bypass signal.

11. The lamp group switching control device according to claim 10, wherein when the first power terminal does not receive the first power source, the second power terminal receives the second power source, and the third power terminal receives the reference low power source, the third switch is turned on in response to the bypass signal with a high voltage level so that the transmission path of the second power source is connected.

12. The lamp group switching control device according to claim 10, wherein when the second power terminal does not receive the second power source, the third switch is turned off in response to the bypass signal with a low voltage level so that the transmission path of the second power source is disconnected.

\* \* \* \* \*